United States Patent [19]

Hiller et al.

[11] Patent Number: 4,787,785

[45] Date of Patent: Nov. 29, 1988

[54] MACHINE TOOL WITH A SPINDLE HEAD

[75] Inventors: Norbert Hiller; Erwin Deuschle, both of Wendlingen; Heinz Vogel, Oberboihingen, all of Fed. Rep. of Germany

[73] Assignee: Gebrueder Heller, Maschinenfabrik, GmbH, Fed. Rep. of Germany

[21] Appl. No.: 58,446

[22] Filed: Jun. 5, 1987

[30] Foreign Application Priority Data

Jun. 6, 1986 [DE] Fed. Rep. of Germany ....... 3619071

[51] Int. Cl.⁴ ............................................. B23C 1/00
[52] U.S. Cl. .................................... 409/136; 409/233
[58] Field of Search .............. 409/233, 135, 136, 201, 409/216; 408/56, 57, 59, 239 R, 239 A

[56] References Cited

U.S. PATENT DOCUMENTS 4,620,824 11/1986 Eckstein et al. ...................... 408/57

FOREIGN PATENT DOCUMENTS 8430433.2 1/1985 Fed. Rep. of Germany .
3411647 10/1985 Fed. Rep. of Germany .

Primary Examiner—Neil Abrams
Attorney, Agent, or Firm—Foley & Lardner, Schwartz, Jeffery, Schwaab, Mack, Blumenthal & Evans

[57] ABSTRACT

A machine tool has a spindle head pivotable through 180 degrees and having a spindle rotatably mounted in its housing. As a result of the pivoting movement, the spindle head can be shifted from a vertical to a horizontal working position. The spindle head has a toolholder and an axially displaceable tension rod. Through the tension rod runs a coolant bore extending into the working zone of the clamped tool. The coolant bore is connected to a line in a transfer piston displaceable in the spindle-head housing. The coolant bore and the transfer piston line are constantly in communication so that coolant flows uninterruptedly during displacement of the transfer piston. The line communicates with a coolant supply system. The coolant can be conveyed into the working zone of the tool in any position of the tool spindle and without any appreciable increase in size of the spindle head.

14 Claims, 2 Drawing Sheets

MACHINE TOOL WITH A SPINDLE HEAD

BACKGROUND OF THE INVENTION

In a known machine tool described in German Offenlegungsschrift No. 3,411,647, the spindle head can pivot 180 degrees relative to the carrier. The tool spindle is thereby brought from a vertical into a horizontal position. During machining, coolant is often required in the working zone of the tools. For machining deep bores or in machining work carried out inside housing, it is highly advantageous if the coolant is conveyed through the interior of the tool into the vicinity of the tool tip. The coolant is thus supplied to the tool through the working spindle (as discussed in German Utility Model No. 8,430,433), this being the so-called internal coolant supply. The hitherto known designs with internal coolant supply have relatively large overall length and are therefore unsuitable for machine tools.

SUMMARY OF THE INVENTION

Among the objects of the invention are to provide a machine tool of the relevant generic type, with the spindle head pivotable 180 degrees relative to a carrier, in which the coolant can be conveyed into the working zone of the particular tool in any position of the tool spindle, wherein the machine construction is simple and whereby there is no appreciable increase in size of the spindle head.

In a machine tool according to the invention, the coolant bore runs through the tension rod which is mounted in the tool spindle, as is known per se. The coolant bore in the tension rod is connected to the line in the transfer piston, via which the tension rod is actuated and displaced axially by the release piston in order to exchange the tools. In every position of the transfer piston, the critical region of connection between the coolant bore in the tension rod and the line in the transfer piston is sealed off, thus ensuring that no coolant can escape from the coolant supply system. The transfer piston can therefore be displaced without difficulty, independently of the coolant supply system, in order to shift the tension rod when the tool is changed. The seal in the region of connection ensures that the coolant supply system is sealed off perfectly even during the displacement of the transfer piston. Because of this internal coolant supply system, there is no need for a costly design of the spindle head. The coolant is conveyed to the working zone of the tool in every working position of the tool spindle. According to the invention, it is possible, instead of installing the drive intended for displacing the transfer piston in the spindle head itself, to arrange the drive as a built-on unit on the slide. The spindle head consequently has an extremely short design which saves space.

Further features of the invention emerge from the further claims, the description and the drawing.

BRIEF DESCRIPTION OF THE DRAWINGS

The invention is explained in detail with reference to an exemplary embodiment illlustrated in the drawings. In these.

DETAILED DESCRIPTION OF THE PREFERRED EMBODIMENTS

Figures 1, 1A:
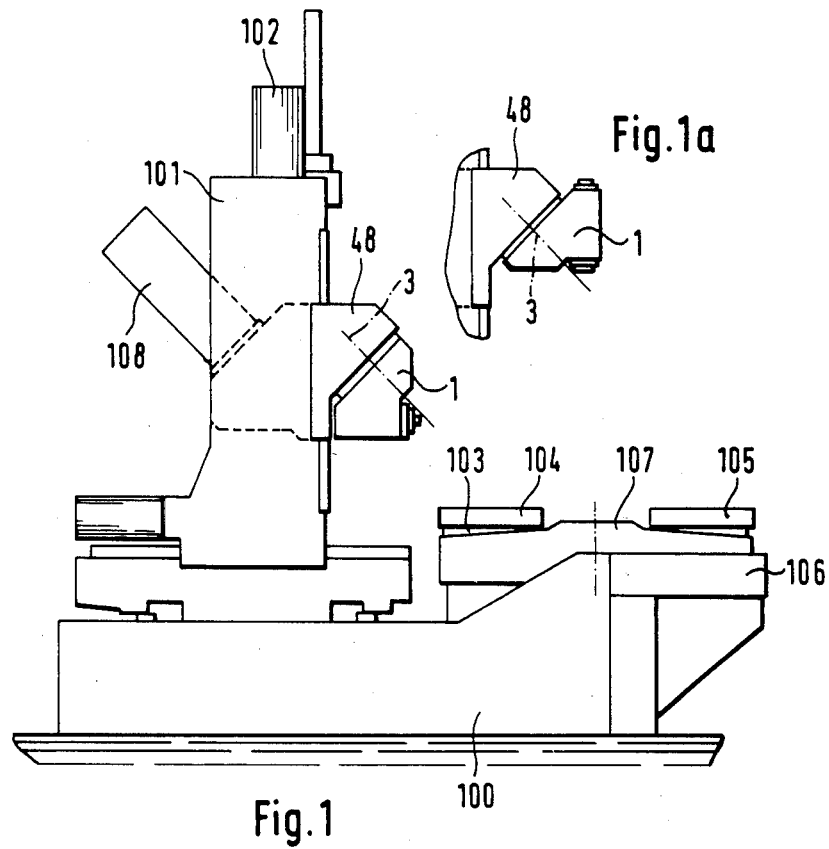
FIG. 1 is a diagrammatic representation of a machine tool according to the invention, the spindle head of which is positioned in the horizontal working position.
FIG. 1a is a view of the spindle head according to FIG. 1 in the vertical working position.

The machine tool has a machine bed 100, on which a machine stand 101 is arranged. A slide 48 is mounted on the machine stand 101 so as to be verticlaly displaceable. The slide 48 carries a spindle head 1. Located in the region in front of the machine stand 101 is turntable 103, on which a workpiece paller 104 is clamped. A further workpiece pallet 105 is located on the workpiece clamping zone 106. The workpiece pallets 104, 105 are interchangeable by means of a pallet change device 107. The axis 3 of the slide 48 is at 45 degrees relative to the horizontal. The spindle head 1 is adjustable in a known way, via the carrier housing 2 (FIG. 2), from the horizontal working position (FIG. 1) into a vertical working position (FIG. 1a).

The spindle head 1 has a housing 4, in which a tool spindle 7 is mounted rotatably by means of bearings 5, 6. Arranged on tool spindle 7 is a bevel wheel 8 which meshes with a bevel wheel 9 in the carrier housing 2. The bevel wheel 9 is mounted on a drive shaft 10 which is mounted in the carrier housing 2 and which is driven in a known way by a drive 108. The tool spindle 7 has a conical toolholder 11 at its free end.

A tension rod 12 is mounted in the tool spindle 78 so as to be axially displaceable relative to spindle 7 while fixed against rotation relative to spindle 7. Tension rod 12 is connected to a clamping device 13, by means of which a tool seated in the toolholder 11 can be clamped. The tension rod 12 is surrounded over part of its length by at least one compression spring; in the exemplary embodiment, a cup-spring assembly 14 is supported on a shoulder 15 of the tool spindle 7 and on an annular abutment 16 which is fixed against rotation relative to the tension rod 12 and which is firmly axially connected to the tension rod 12. The abutment 16 is located on one end of the tension rod 12 and has a ring 17 which is coaxial with the tension rod 12 and which extends from the abutment in the direction to the toolholder 11. The ring 17 is radially spaced from and surrounds a bushing 18 which rests against the inner wall 19 of the housing 4 and is secured axially. The ring 17, which is also radially spaced from the inner wall 19 of the housing 4, acts together with the bushing 18 to limit an annular receiving space 20 for the cup-spring assembly 14.

The tension rod 12 has a flange 21 which is directed radially outwards and which rests against the inner wall 22 of a part 23 of the tool spindle 7 of the larger, inside diameter. The flange 21 is located between two stops 24 and 24, of which the stop 24 is a spring ring located in the inner wall 22 of the spindle part 23 and the stop 25 is a shoulder of the spindle part 23.

The tension rod 12 has a central axial bore 26 which passes through it completely. Inserted sealingly into the end of the tension rod 12 facing away from the toolholer 11 is a bushing 27, the end face of which carries a sealing ring 28 preferably consisting of ceramic material. The bushing 27, together with the sealing ring 28, is fixed against rotation relative to the tension rod 12.

Facing the tension rod 12 at a short distance from it is a transfer piston 29 which is mounted in the spindle-head housing 4 so as to be axially displaceable. It has, closely adjacent to the tension rod 12, an annular flange 30 which is directed radially outwards and which receives, along its periphery, threaded bolts 31 projecting axially from it and reaching into bores 32 in the spindle-head housing 4. Inside the bore 32, the threaded bolts 31 are surrounded by compression springs 33 supported on the bolt head 34 and on the bottom 35 of the bores 32. The diameter of the bores 32 is greater than the bolt-head diameter of the threaded bolts. A bore 36 of a diameter matching the shank diameter of the threaded bolt 31 opens into the bottom 35 of the bores 32. The transfer piston 29 can be displaced towards the tension rod 12 counter to the force of the compression springs 33. At the same time, it is guided on the inner wall 37 of an end portion 38 of reduced inside diameter of the spindle-head housing 4. In the initial position shown in the drawing, the annular flange 30 of the transfer piston 29 rests against a radially extending shulder face 39 of the spindle-head housing 4, this shoulder face 39 connecting the cylindrical inner wall 37 of smaller inside diameter to the cylindrical inner wall 19 of larger diameter of the spindle-head housing 4. In the transfer piston 29 there is, aligned with the bushing 27, a further bushing 40 which likewise carries a sealing ring 41 on its end face. The bushing 40 is under the force of a compression spring 42 which is supported on a abutment 43 of the transfer piston 29 and on a radially outward-directed flange 44 of a thrustpiece 45. The thrustpiece 45 is mounted in a central blind-hole bore 46 in the transfer piston 29 and is urged by the compression spring 42, against the end face of the busing 40 which faces away from the sealing ring 41, thereby pressing the sealing ring 41 against the sealing ring 28 of the bushing 27 which is mounted in the tension rod 12. The compression spring 42 surrounds the thrustpiece 45 and is seated in the blind-hole bore 46. The thrustpiece 45 rests on a screw 47 which is screwed into the bottom of the blind-hole bore 46. When the transfer piston 29 is displaced axially in order to actuate the tension rod 12, the screw 47 shifts relative to the stationary thrustpiece 45. The bushing 40 is fixed against relative rotation with transfer piston 29, so that when the spindle head 1 is in operation, the sealing ring 28 rotates relative to the sealing ring 41 resting on it.

A release piston 49 mounted in the slide 48 and preferably hydraulically actuated is adapted to actuate the transfer piston 29. This release piston 49 is accommodated in a cylinder 50. At the end facing away from the transfer piston 29, there is arranged on the release piston 49 a setting ring 51 which is screwed onto the release piston 49 and which, when the release piston is actuated, interacts with two switches 52 and 53 controlling the stroke of the release piston. The stroke of the release piston 49 can be adjusted very accurately and precisely by means of the setting ring 51.

A coolant supply system is provided for feeding coolant and/or lubricant into the working zone of the tool clamped in the toolholder 11. Coolant and compressed air are supplied from the carrier housing 2 via a line 54 which opens into a line 55 extending parallel to the tension rod 12 in the spindle-head housing 4. In the region of the transfer piston 29, line 54 merges, via a radial intermediate line 56, into a radial connecting line 57 located in the transfer piston 29 and opening into the blind-hole bore 46. The thrustpiece 45 is designed so that coolant or compressed air flowing in via the connecting line 57 can pass into a through-bore 58 in the bushing 40. The through-bore 58 is aligned with the through-bore 59 in the bushing 27. The transition region between the two bushings 40 and 27 is sealed off by the sealing rings 41 and 28 resting against one another. The through-bore 59 forms a continuation of the bore 26 in the tension rod 12. The bore 26 opens, at the end facing away from the bushing 27, into a distributor space 60 and branch lines open into distributor space 60. One branch line 61 is shown in the drawing. The branch lines 61 pass through the clamping device 13 and are connected to lines 62 which extend up to the end face 63 of the tool spindle 7. The coolant or lubricant flows out of the lines 62 and passes through the tool clamped in the toolholder 11 into the working zone of the tool tips.

In the supply system (not shown) for the coolant there if, as is known per se, a reversing device, by means of which either coolant or compressed air can be conveyed into the coolant supply system. The compressed air is blown through the lines 54 to 57, 46, 58, 59, 12 and 60 to 62, when the coolant is to be removed from these lines. Moreover, the machined workpiece can also be blown out by means of the compressed air. The coolant or compressed air supply system runs centrally through the tension rod 12.

Completely separate from the coolant or compressed air supply system is a system in the spindle-head 1 for supplying compressed air for blowing out the toolholder 11. By means of this compressed air, the toolholder 11 is blown out during the tool change, so that particles of dirt cannot enter the holder when the tool is changed. So that the inner wall 64 of the toolholder 11 can be blown out cleanly, the compressed air is blown centrally into the toolholder 11. Particles of dirt located on the outer wall of the shank of the particular tool can also be blown away as a result. Instead of compressed air, any other suitable cleansing medium can also be blown into the toolholder 11 through this separate supply system.

The compressed air is likewise fed from the carrier housing 2 to a line 65 extending in the spindle-head housing 4. In the transfer piston 29 there is a connecting line 66 which is to be put in communication with the line 65 and which extends first radially and then axially and ends in the flange 30. In flange 30 there are one or more radial bores 67, into which open, at a short radial distance from the bushing 40, line portions 68 extending up to an axially projecting end face 69, facing the tension rod 12, of the flange 30. Aligned with the line portions 68, there are in the tension rod 12 bores 70 which extend essentially axially at a radial distance from the central bore 26 and which open into a distributor space 71 located between the flange 21 of the tension rod 12 and the stop 25 of the tool spindle 7. Axial lines 72 arranged in the clamping device 13 extend from the distributor space 71 and open centrally into the toolholder 11.

The drawing shows the spindle head in the working position, in which a tool is clamped in the toolholder 11. In this position, the transfer piston 29 is at an axial distance from the tension rod 12. It is in its axially retracted position, so that the collet chucks of the clamping device 13 pull the tool firmly into the toolholder 11. In the retracted position, the transfer piston 29 rests by means of its flange 30 against the shoulder face 39 of the spindle-head housing 4 under the force of the compression springs 33. The connecting line 66 in the transfer piston 29 is located in the region near the line 65 in the spindle-head housing 4, so that no cleansing medium, which is preferably compressed air in the exemplary embodiment, can be blown into the toolholder 11. The coolant is conveyed in the way described to the working zone of the tool via the central bore 26 of the tension rod 12.

If the tool is to be exchanged, the release piston 49 is extended while tool spindle 7 is idle against the transfer piston 29 and, during a further stroke, it displaces transfer piston 29 axially counter to the force of the compression springs 33, until its flange 30 butts against end face 69 of the tension rod 12. During a further stroke of the release piston 49, the tension rod 12 and the clamping device 13 are shifted axially, and in a known way the collet chucks of the clamping device release the tool which can then be removed, preferably automatically, from the toolholder 11. The stroke of the release piston 49 51 butts against the plane face 78 of the cylinder cover 77. The transfer piston 29 shifts relative to the thrustpiece 45 and to the bushing 40, thereby compressing the compression spring 46 and firmly pressing the sealing ring 41 against the sealing ring 28. When the transfer piston 29 is in the axially displaced end position, the connecting line 66 communicates with the line 65. Furthermore, the line portions 68 are connected to the bores 70 in the tension rod 12. As a result, the cleansing medium can flow into the toolholder 11 via the lines 65, 66, 67, 68, 70, 71 and 72. Dirt and chips can be blown off the new tool to be fitted in the toolholder 11, before insertion, by the cleansing medium flowing out under pressure. The cleansing medium can even by supplied as early as when the released tool is pulled out of the toolholder 11. The inner wall 64 of the toolholder 11 and the toolshank are consequently cleaned perfectly. During the exchange operation, the coolant supply is, of course, interrupted. Because of the design described, the lines for supplying the cleansing medium run completely separately from the coolant supply system, so that the two media do not come in contact with one another.

When the new tool is inserted into the holder 11, the release piston 49 is subjected to pressure in the opposite direction and is returned to its initial position. Since the tension rod 12 has been shifted counter to the force of the cup-spring assembly 14, cup-spring assembly 14 now pushes the tension rod axially back into its intial position. The compression springs 33 also press the transfer piston 29 back towards its initial position shown in the drawing. The clamping device 13 is pushed back axially, and the collet chucks clamps the new tool in the toolholder 11 in the known way. As soon as the release piston 49 has reached its end position shown in the drawing, the setting ring 51 trips the switch 52 which signals "tool clamped" to the machine control. By means of an appropriate control, the coolant can now be fed, via the supply system described, into the working zone of the tool, with the tool spindle 7 simultaneously rotating. In the working position shown, all the stationary parts of the spindle head 1, apart from the stationary sealing ring 41 of the bushing 40, are separated from the rotating tool spindle 7. The new tool is clamped perfectly in the toolholder 11 by means of the cup-spring assembly 14.

A machine designed according to the invention ensures that the coolant passing through does not reach the region of the bearings 6 of the tool spindle 7 should leakage occur in the sealing region of the two sealing rings 28, 41. Since the ring 17 of the abutment 16 is at a radial distance from the inner wall 19 of the spindle-head housing 4, an annular space 73 is formed between the ring 17 and the housing inner wall 19, and through this annular space 73 the coolant can flow up to outlet bores 74, from which the leaking coolant can flow out of the spindle-head housing 4. The bushing 18 is sealed out relative to the inner wall 19 of the spindle-head housing 4.

As described above, compressed air can also be supplied through the coolant line for blowing the coolant line free, if the supply device (not shown) is switched appropriately. The coolant also ensures lubrication of the sealing rings 28 and 41.

What is claimed is:

1. A machine tool which provides uninterrupted coolant flow to a tool, comprising:
    a spindle head movable between a vertical and a horizontal working position;
    a tool spindle rotatably mounted in said spindle head and provided with a toolholder having a coolant passage communicating with the tool;
    a clamping means mounted in said spindle for selectively clamping and release the tool, said clamping means having inner end portions which are engageable during releasing of the tool;
    an axially movable tension rod having opposed axial ends, and means for axially moving said rod so that one axial end thereof is adapted to engage said inner end portion of said clamping means to cause said clamping means to release the tool, said tension rod having a coolant bore extending axially therethrough, said coolant bore having a sealing means at an open end opposite said one axial end of said tension rod; and
    a transfer piston, and means for moving said transfer piston axially relative to said tension rod to selectively contact the other axial end of said tension rod to transfer axial movement to said tension rod, said transfer piston surrounding a coolant supply line communicating with said coolant bore in said tension rod and having sealing means in sealing engagement with said coolant bore sealing means, said transfer piston being axially movable with respect to said coolant supply line whereby said respective sealing means maintain said coolant bore and said coolant supply line in constant communication so that coolant can be flowed uninterrupted through said coolant supply line, said coolant bore and said coolant passage to the tool irrespective of the axial position of said transfer piston.

2. A machine tool as claimed in claim 1 wherein said transfer piston is out of contact with said tension rod when the machine tool is in operation, and said coolant bore and said coolant supply line remain in communication during operation of the machine tool.

3. A machine tool as claimed in claim 1 wherein said coolant bore sealing means comprises a first bushing provided with a sealing ring on its end face.

4. A machine tool as claimed in claim 1 wherein said coolant supply line sealing means comprises a second bushing provided with a sealing ring on its end face and said sealing ring is sealingly engaged with said sealing ring of said first bushing.

5. A machine tool as claimed in claim 4 wherein said transfer piston rod is displaceable relative to said second bushing.

6. A machine tool according to claim 5 wherein said first and second bushings form a continuation of said coolant bore.

7. A machine tool as claimed in claim 4 wherein a spring means urges said sealing ring of said second bushing against said sealing ring of said first bushing.

8. A machine tool as claimed in claim 1 and further comprising a cleansing medium supply system for supplying a cleansing medium to said spindle head comprising a passage line within said transfer piston communicating with a receiving line within said tension rod.

9. A machine tool as claimed in claim 1 wherein said cleansing medium supply system is not in operation when the machine tool is operated.

10. A machine tool as claimed in claim 8 wherein said passage line in said transfer piston is out of communication with said receiving line in said tension rod when the machine tool is in operation.

11. A machine tool as claimed in claim 8 wherein said passage line in said transfer piston is in communication with said receiving line in said tension rod when said transfer piston is axially moved.

12. A machine tool as claimed in claim 1 and further comprising an entry coolant line in the machine tool communicating with said coolant supply line in said transfer piston.

13. A machine tool as claimed in claim 1 wherein said means for moving said transfer piston comprises a drive displaceable along a slide to contact and displace said transfer piston.

14. A machine tool as claimed in claim 13 wherein said drive has a release piston aligned with said transfer piston and adapted to contact and displace said transfer piston.

* * * * *

UNITED STATES PATENT AND TRADEMARK OFFICE
CERTIFICATE OF CORRECTION

PATENT NO. : 4,787,785

DATED : November 29, 1988

INVENTOR(S) : Norbert HILLER et al

Figure 2:
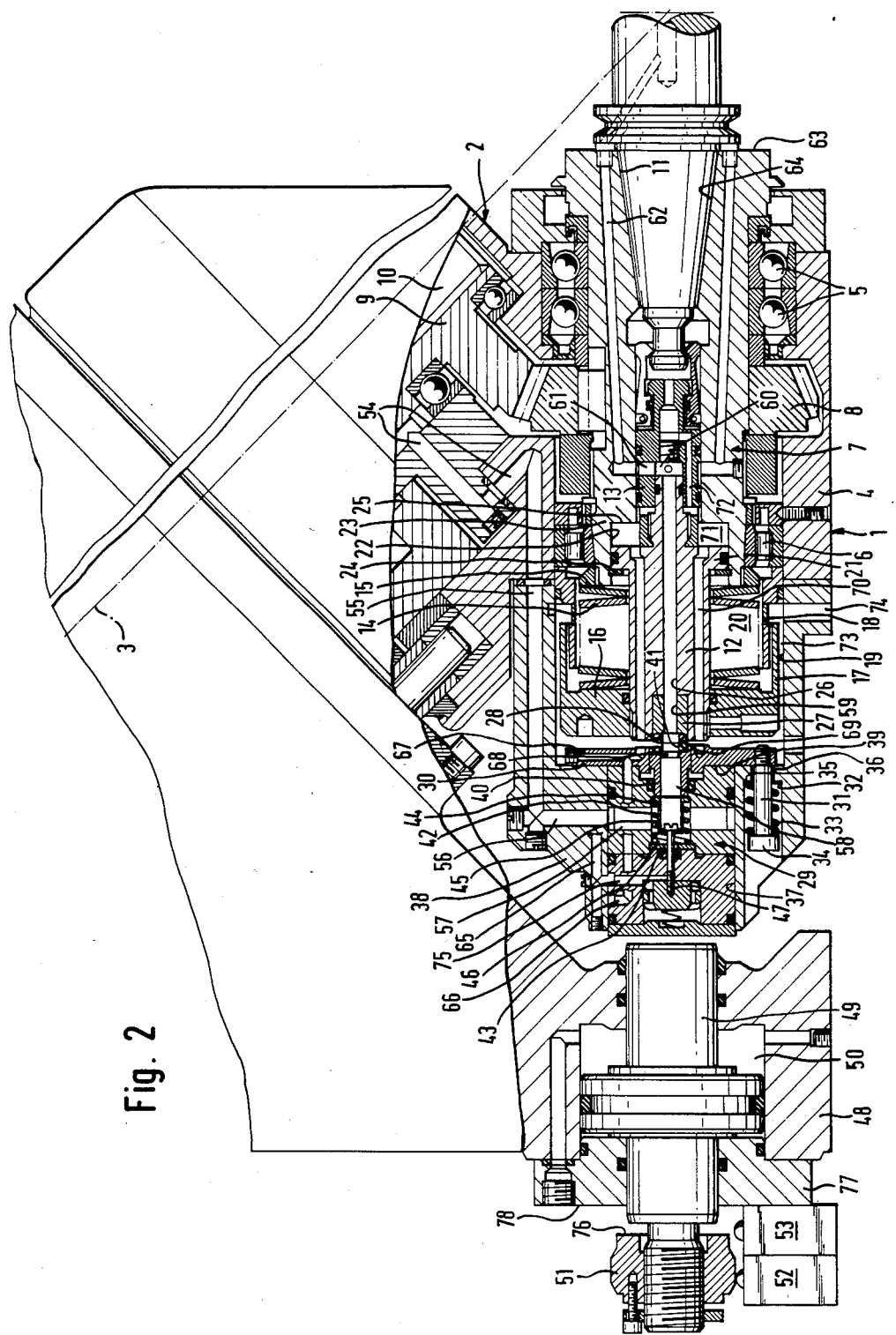
FIG. 2 is a section through the spindle head in its horizontal working position.
Figure 2:
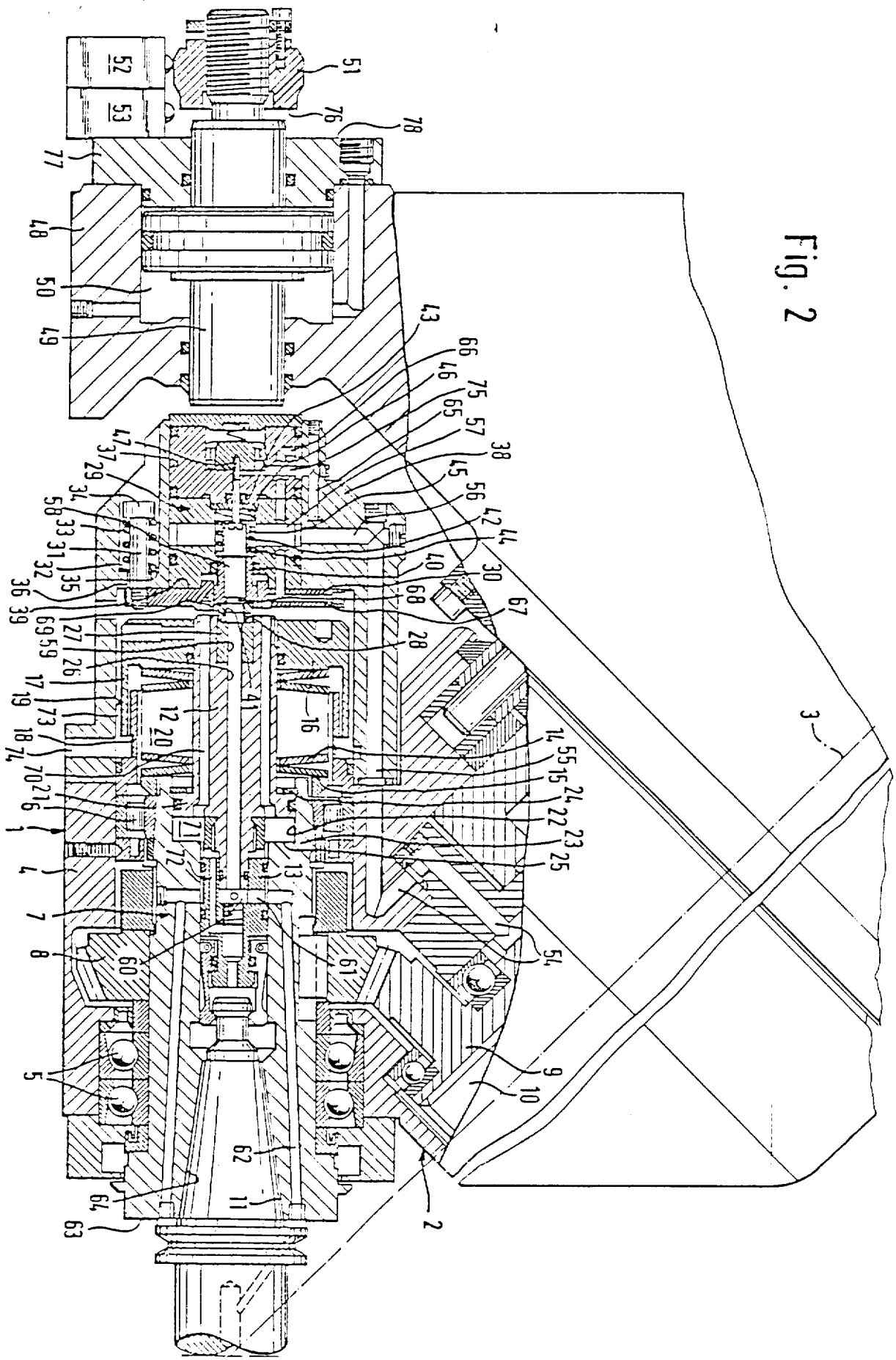

It is certified that error appears in the above-identified patent and that said Letters Patent is hereby corrected as shown below:

In the drawings, please substitute the attached figure for Fig. 2.

Signed and Sealed this

Twenty-fourth Day of October, 1989

Attest:

DONALD J. QUIGG

Attesting Officer

Commissioner of Patents and Trademarks